July 16, 1974  M. C. DEIBERT  3,824,166
TRACE GAS ANALYZER

Filed Dec. 30, 1971

United States Patent Office 3,824,166
Patented July 16, 1974

3,824,166
TRACE GAS ANALYZER
Max C. Diebert, Needham Heights, Mass., assignor to
Anacone, Inc., Ashland, Mass.
Filed Dec. 30, 1971, Ser. No. 214,240
Int. Cl. G01n 27/46
U.S. Cl. 204—195 R          13 Claims

ABSTRACT OF THE DISCLOSURE

A trace gas analyzer for detecting and measuring amounts in the range of from 0 to 1000 p.p.m. of a trace gas in a gaseous stream. The detection cell has a first electrically conductive, non-consumable gas diffusion electrode of microporous, hydrophobic material dividing the interior of the cell into two chambers, a gas chamber on one side closed to ambient atmosphere and having a gas inlet and a gas outlet for the gas to be analyzed and an electrolyte chamber on the other side, having a second electrode, and a liquid electrolyte in the electrolyte chamber contacting both electrodes, including a substantial volume of unadsorbed free electrolyte confined in the electrolyte chamber by the microporous hydrophobic electrode. A reservoir communicating through the second electrode to the space between the electrodes is featured.

---

This invention relates to trace gas analyzers and more particularly to an improved analyzer incorporating a detection cell for detecting and measuring amounts in the range of from 0 to 1000 p.p.m. (parts per million) of a trace gas in a gaseous stream, in particular trace quantities of oxygen.

It is a principal object of this invention to provide a trace gas analyzer which minimizes the risk of electrolyte contamination during analysis and maximizes the area of contact of electrolyte and gas with said electrode. Other objects are to provide a cell which may be readily reactivated after contamination; to eliminate the need for carefully controlling the humidity of the gas stream to be analyzed; to provide a rugged detection cell design relatively insensitive to ambient and gas temperatures; and to provide an analyzer suitable for industrial applications for the measurement of minute quantities of a trace gas in a gaseous stream.

In general, the invention features a trace gas analyzer system comprising a detection cell which generates microamp currents in response to amounts up to 1000 p.p.m. of said trace gas, and means electrically connected to the detection cell responsive to such currents for measuring and indicating the amounts by a proportional response. In the system, a detection cell is provided which comprises a housing enclosing a volume and having on one side a gas inlet and a gas outlet, and on the other side a liquid inlet and a liquid outlet. A first electrically conductive, non-consumable, gas diffusion electrode of microporous, hydrophobic material spans the interior of the housing, dividing the volume into two chambers: a gas chamber adjacent the gas inlet and the gas outlet on one side of the first electrode, and an electrolyte chamber adjacent the liquid inlet and the liquid outlet on the other side of the first electrode. A second electrically conductive electrode is provided in the electrolyte chamber and partially occupies the electrolyte chamber. A liquid electrolyte is also provided in the electrolyte chamber contacting the first and second electrodes. The first electrode, by virtue of its microporous hydrophobic character confines the electrolyte to the electrolyte chamber. A substantial quantity of the electrolyte forms an unadsorbed reservoir of free electrolyte in the electrolyte chamber. Electrical terminals are provided, connected to the electrodes within the housing, and to the measuring means.

In a preferred embodiment, the electrolyte reservoir is provided on the side of the second electrode, opposite the first electrode, and the second electrode comprises a porous member of sufficient porosity to permit passage of electrolyte therethrough. The second electrode is substantially coextensive with the first electrode, both preferably being planar and parallel to one another. A porous planar adsorbent sheet separator is substantially coextensive with and sandwiched between the first and second electrodes. The second electrode and the separator together only partially occupy the electrolyte chamber the remainder of the chamber comprising the electrolyte reservoir. In the preferred embodiments described herein, the first electrode comprises electrically conductive, microporous, hydrophobic carbon, the sheet separator is asbestos, the second electrode comprises porous cadmium, and the electrolyte comprises potassium hydroxide, whereby the cell is adapted for the detection of trace amounts of $O_2$ in a gaseous stream.

Other objects, features, and advantages of this invention will be apparent to those skilled in the art from the following detailed description of the preferred embodiment thereof, taken together with the accompanying drawings in which.

Figure 1:
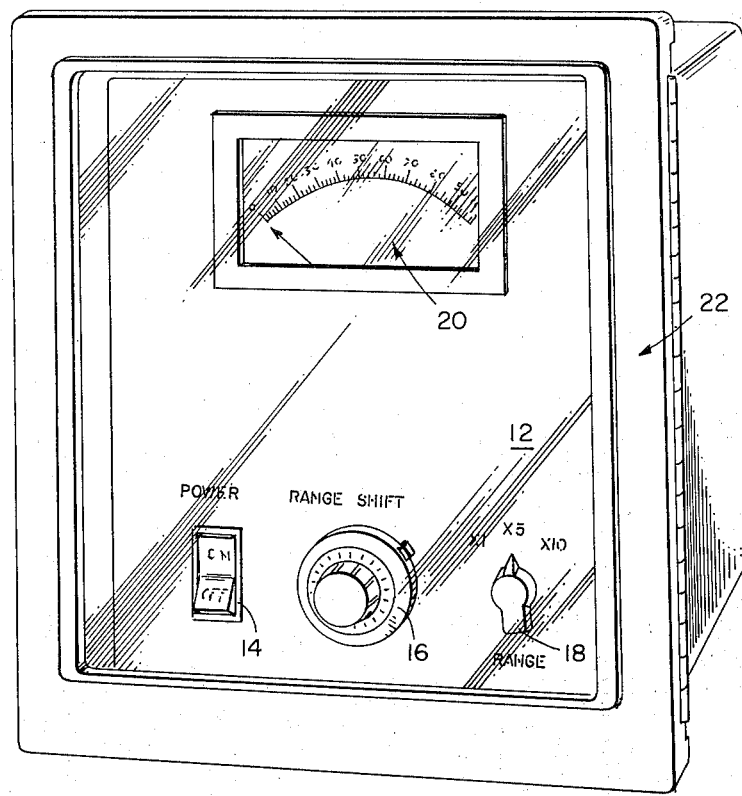
FIG. 1 is a perspective view of the cabinet for an analyzer system, showing the front panel controls and meter thereof.
Figure 2:
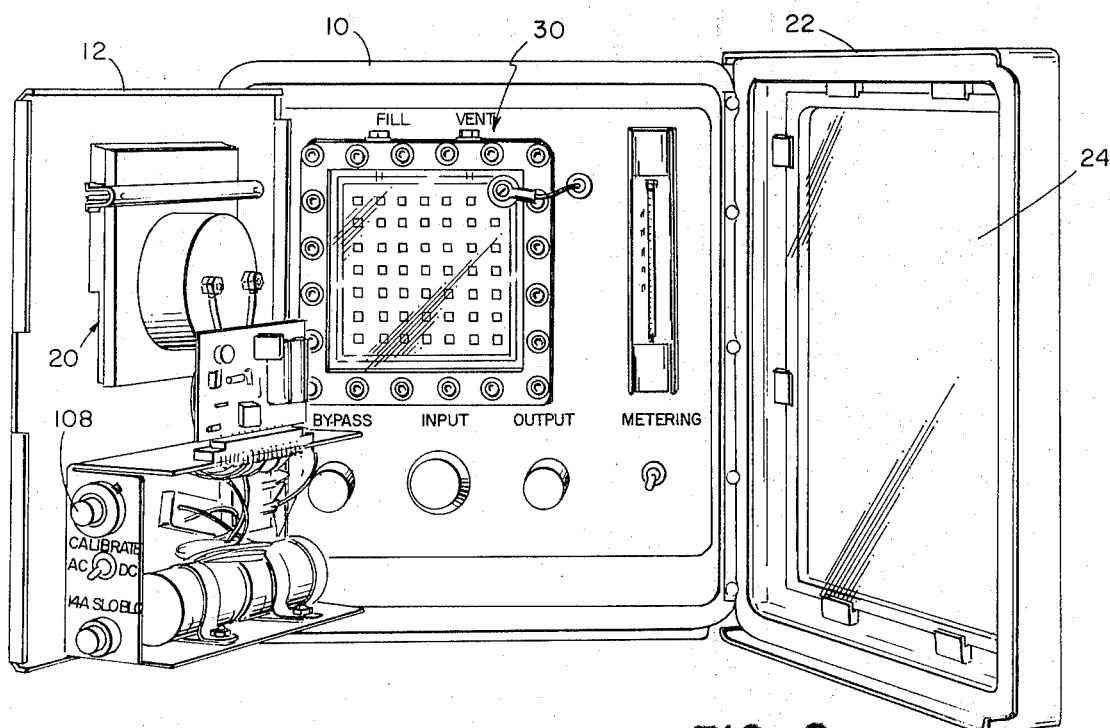
FIG. 2 is a front view of the system shown in FIG. 1 with the cabinet doors opened, displaying the detection cell within.

With reference now to the drawings and more particularly to FIGS. 1 and 2 thereof, the trace gas system is contained in a cabinet 10. The front of the cabinet comprises a control panel 12 including appropriate function switches 14, 16, and 18 and a meter 20 for indicating the amounts of oxyen in a gas stream being tested. As best shown in FIG. 1, panel 12 is positioned behind a hinged door 22 having a glass covered viewing aperture 24 through which the controls 14, 16, and 18 and the meter 20 may be viewed during operation of the system. Panel 12 is also hinged to the cabinet 10 on the side thereof opposite door 22. Mounted within the cabinet behind panel 12 is a detection cell 30.

Figure 3:
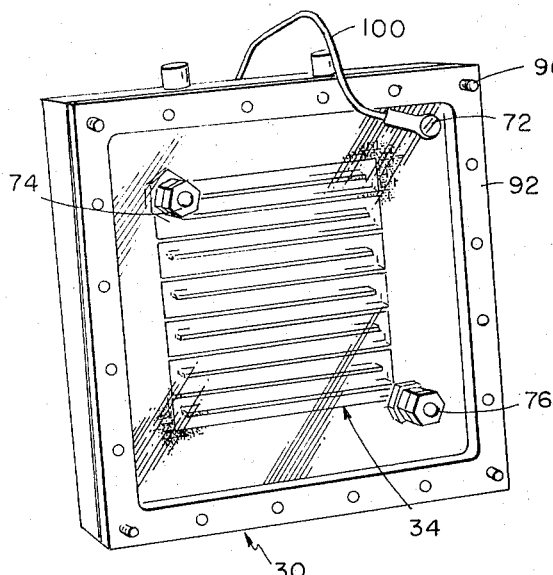
FIG. 3 is an enlarged perspective view of the detection cell shown in FIG. 2, showing the gas side thereof.
Figure 4:
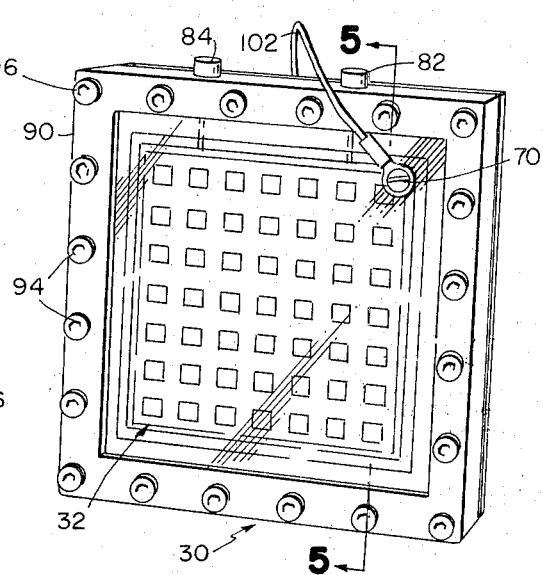
FIG. 4 is a view similar to FIG. 3 showing the electrolyte side of the detection cell.
Figure 5:
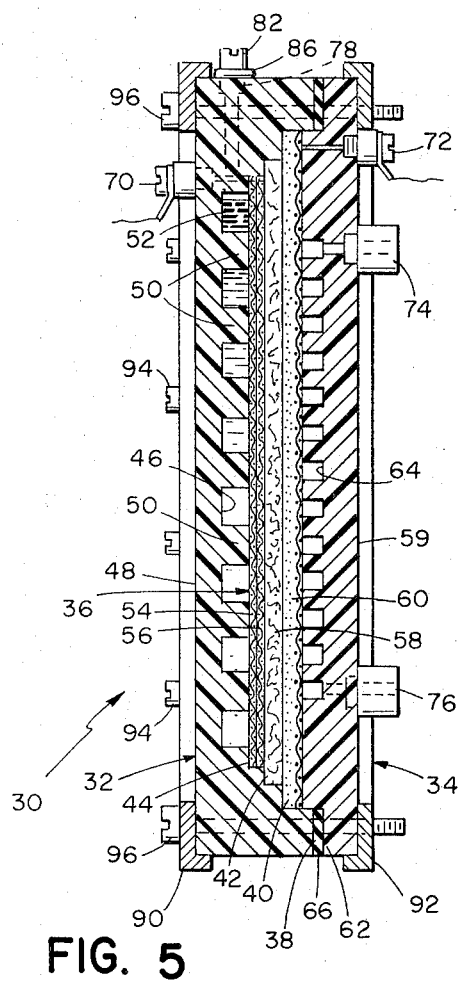
FIG. 5 is a sectional view of the detection cell taken along the line 5—5 of FIG. 3.

Cell 30, best shown in FIGS. 3-5, comprises a housing having generally square front and rear walls 48, 59. The housing is formed from two adjacent mating blocks 32, 34 of transparent polymeric material, such as acrylic resin. Each block 32, 34 has a continuous wall 48, 59 on the exterior thereof and is recessed on the interior to define an enclosed volume, generally designated 36. Block 32 is centrally recessed to form a female part and block 34 has a machined recessed edge to form a male part mating with female block 32 and a shoulder 62 abutting the adjacent edge 38 of block 32.

In greater detail, female block 32 is recessed adjacent block 34 to form a generally square recess inwardly of edge 38. A series of successively and more inwardly set machined steps 40, 42, 44 is provided within and continuously about the inner periphery of the recessed portion of female block 32. Female block 32 is recessed inwardly of step 44 toward wall 48 to define an electrolyte reservoir 46 adjacent the wall 48 of female block 32. A plurality of discontinuous support posts 50 extend from wall 48 to a position coplanar with the surface facing male block 34 of the most inwardly positioned step 44. The net volume of reservoir 46 is approximately 40 cc.

Positioned on step 44, spanning the interior of female block 32 and reservoir 46 and having one surface supported against posts 50, is an anode comprising two identical planar anode members 54, 56, each member comprising a foraminous nickel screen, of approximately 20 mesh, having an electrodeposited coating of about 10 amp. hours of cadmium thereon and having an area of about 10 in.$^2$. The anode structure is highly porous and at least mildly hydrophilic permitting good contact with an electrolyte 52 in reservoir 46 and ready passage of the electrolyte thereby.

On step 42 is highly porous, adsorbent, non-conductive, planar sheet separator member 58, preferably of high purity asbestos. Separator 58 spans the interior of female section 32 in contact with the complete adjacent surface area, of anode member 56 and extending beyond the margin of member 56 about the periphery thereof to ensure separation of the anode and the cathode to be described.

On step 40, inwardly of edge 38, is a planar, electrically conductive gas diffusion electrode forming the cathode 60 of a detection system. Cathode 60 spans the interior of female block 32 having its surface adjacent anode members 54, 56 in contact with the complete adjacent surface area of separator 58 and extending slightly beyond the margin of separator 58 about the entire periphery thereof. Cathode 60, on the side adjacent separator 58, comprises a continuous, microporous, i.e., having a pore size smaller than about 100 microns, preferably about 0.1 microns, hydrophobic material. In the preferred embodiment carbon comprising acetylene black is employed, the carbon being in a matrix of hydrophobic polymeric material, e.g., polytetrafluoroethylene. The matrix comprising about 10% carbon, 10% polytetrafluoroethylene and about 80% open pores is coated and supported on the anode side of a 30 mesh stainless steel screen which, in addition to supporting the matrix, serves as a current collector in the operation of the cell. The cathode 60 has a total thickness on the order of 20–30 mils, the screen having a thickness on the order of 6–8 mils.

Male housing section 34 is machined about its edge facing female block 32 to fit within the corresponding edge 38 thereof and to define a shoulder 62 adjacent the facing surface of edge 38. An elastomeric gasket 66 between shoulder 62 and edge 38 is provided to render the volume enclosed by said blocks 32, 34 air tight. Male block 34 has its surface adjacent cathode 60 in contacting and supporting relation therewith about the periphery thereof, sealing cathode 60 against step 40 thereat, and across the adjacent surface thereof except at labyrinthine groove 64 formed on the interior of wall 59 thereof. Groove 64 comprises the gas chamber and is formed in the surface of section 34 adjacent cathode 60, winding back and forth across substantially the entire adjacent surface of cathode 60, to define a path for the gas to be tested.

Reservoir 46 is filled with unadsorbed free liquid electrolyte 52 comprising in the preferred embodiment 5 molar potassium hydroxide. Electrolyte 52 contacts and passes through anode members 54, 56 and is partially adsorbed by separator 58 contacting the adjacent surface of cathode 60. Cathode 60 by virtue of its microporous hydrophobic structure on the side thereof adjacent separator 58 contains the electrolyte 52 on the anode side of cell 30, when cell 30 is arranged vertically as shown in FIG. 5, while permitting gas diffusion from the gas side to the electrolyte-gas-cathode interface by virtue of its microporous structure. Cathode 60 thereby divides the enclosed volume of cell 30 into two chambers, a gas chamber on one side defined by serpentine groove 64 and cathode 60 and an electrolyte chamber on the other side containing electrolyte reservoir 46, and only partially occupied by anode members 54, 56 and separator 58.

Electrical terminals 70, 72 extend through blocks 32, 34 and are respectively connected to the anode members 54, 56 and cathode 60, above the level of reservoir 46, terminal 70 being connected to the anode members by a stainless steel wire (not shown) secured to the supporting nickel screen thereof, and terminal 72 being electrically connected to cathode 60 by contacting the supporting stainless steel screen thereof. Epoxy sealant (not shown) is placed about terminals 70, 72 adjacent cell 30 to ensure air tightness.

A gas inlet port 74 and a gas outlet port 76 communicating with opposite ends of serpentine groove 64 are provided in the male block 34. The gas ports 74, 76 have associated fittings to permit connection thereof with tubing 75, 77, illustrated in FIG. 6, through which a gas sample is fed to and exhausted from cell 30.

Two threaded ports 78, 80 are also provided on the top of cell 30 communicating with reservoir 46. Electrolyte 52 is added or removed through one of the ports 78, 80, the other functioning as a vent. Threaded bolts 82, 84 and O-rings 86, 88 provide airtight closure means therefor.

The cell is secured together by apertured peripheral aluminum frames 90, 92 about the edges of cell sections 32, 34 and by machine bolts 94 extending from one frame 90 through housing sections 32, 34 into threaded engagement with the other frame 92. Corner bolts 96 extend from frame 90, through cell 30, to and beyond frame 92, for threaded engagement with threaded holes in cabinet 10 (not shown).

A cell of the type described has a number of advantages in a trace gas analysis system for detecting and measuring trace amounts $O_2$. Thus the provision of a large reservoir of electrolyte and means for it to circulate from the reservoir to the anode and cathode minimizes the risk of early contamination from minute amounts of carbon dioxide, which reacts with the potassium hydroxide electrolyte to form potassium bicarbonate which, in sufficient concentrations, deactivates the cathode and the cell. Moreover, should the cell be thus contaminated it may be readily reactivated, by draining and replacing the electrolyte. This ability to reactivate the cell after contamination is apparently the result of the microporous hydrophobic nature of the cathode which prevents contamination within the cathode pores.

The cell provides physical separation of the gas and electrolyte sides thereof maximizing the area of gas-electrolyte-cathode contact and rendering precise orientation relatively uncritical.

The large reservoir of electrolyte minimizes the need for controlling the humidity of the test gas sample. As evaporation of electrolyte occurs, the level thereof may be visually observed through the transparent cell wall and electrolyte may readily be added or replaced as needed.

The wicking action of the separator feeding electrolyte across the entire adjacent surface areas of the cathode and anode regardless of the level of electrolyte in the reservoir renders the cell activity virtually independent of the volume of unadsorbed electrolyte.

The close spacing of the electrodes assures a rapid response rate, e.g., about 90% in 30 seconds.

Finally, the carbon-cadmium electrode system is minimally temperature sensitive which, taken together with the inherently rugged cell design having peripheral metal frames, a polymeric housing and internally supported electrodes, permits use of the cell in a variety of hostile industrial environments where sensitive, fragile devices would never survive.

In operation, a test gas sample is admitted to inlet 74 and is fed at a rate of 25 cc./min. (1 atm., 70° F.) through groove 64 across the face of cathode 60 to outlet 76. As the gas traverses the surface of cathode 60, it diffuses through the pores of cathode 60 to the carbon-gas-electrolyte interface adjacent the electrolyte side of the cathode. $O_2$ in the gas is electrochemically consumed at the cathode and the anode is consumed by oxidation, thus generating an electric current proportional to the amount of $O_2$ fed to the cell. The electrode reactions in the cell are:

Cathode
$$O_2 + H_2O + 4e^- \rightarrow 4OH^-$$
Anode
$$2Cd + 4OH^- \rightarrow 2H_2O + 2CdO + 4e^-$$

Thus, four equivalent currents are passed through the cell for each mole of $O_2$.

The current developed by the cell in response to a gas containing 1 p.p.m. of $O_2$ at a flow rate of 25 cc./min. (1 atm., 70° F.) is given by:

$$I \text{ amp} = \frac{\left(25 \frac{cc.}{min.}\right)\left(4 \frac{eql.}{mol}\right)\left(96,500 \frac{amp-sec.}{eql.}\right)\left(10^{-6} \frac{mol}{mol}\right)}{\left(60 \frac{sec.}{min.}\right)\left(22,400 \frac{cc.}{mol}\right)\left(\frac{530 \; T°}{492 \; T°}\right)}$$
$$= 6.7 \; \mu a.$$

Thus, cell current is proportional to $O_2$ concentration and equals, in microamps, 6.7 times the p.p.m. $O_2$ concentration in the test gas sample.

Since, as above mentioned, approximately 10 amp hours of cadmium is provided in the anode, the cell life will equal $10^6$ hours if continuously measuring 1 p.p.m. $O_2$ and will equal $10^3$ hours if continuously measuring 1000 p.p.m. $O_2$.

Figure 6:
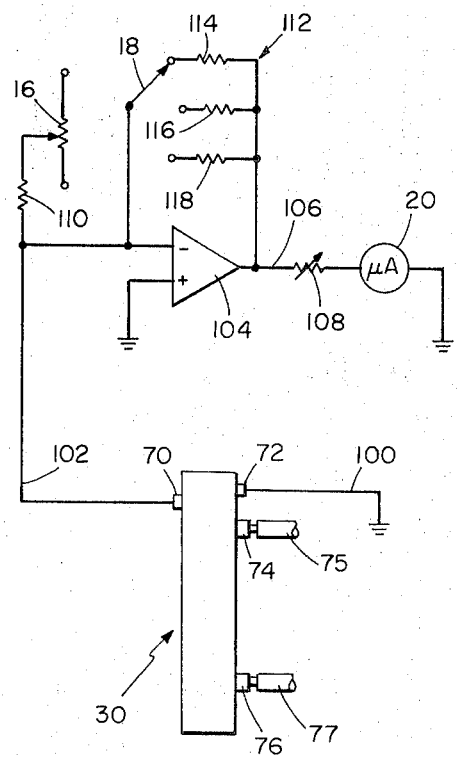
FIG. 6 is a partly schematic diagram of the gas detection system showing the basic elements of the electrical circuit thereof.

The basic circuit in which the cell 30 is employed is illustrated in FIG. 6. To measure the output of cell 30, voltage drop across the cell is limited to less than about 50 millivolts at 1000 p.p.m. $O_2$. Accordingly, cell 30 is connected to a low impedance detection circuit. In the preferred embodiment, terminal 72, connected to the cathode, is connected by lead 100 to ground. Terminal 70, connected to the anode, is connected by lead 102 to the negative input terminal of an operational amplifier 104, model LM 301A manufactured by National Semi Conductor Corporation, of Santa Clara, Calif., in the preferred embodiment. The positive input terminal of operational amplifier 104 is connected to ground, essentially short circuiting cell 30 at nearly 0 impedance, 0 voltage, to maximize the cell efficiency. Operational amplifier 104 is connected to a power source (not shown).

Lead 106 connects the output of operational amplifier 104 to variable resistor 108, used for calibrating the system in accordance with standard test gases, and then to microammeter 20. A recorder output (not shown) may also be provided.

A potentiometer 16, connected between a power source (not shown) and, through resistor 110 to lead 102 provides zero adjustment means for regulating background current from cell 30. Thus if no $O_2$ is present and meter 20 gives a positive or negative reading, the potentiometer is adjusted until meter 20 reads zero.

Amplification of the system is controlled by feedback circuit 112 extending between the negative input and the output of the operational amplifier 104. Circuit 112 includes switch 18 for selective switching between three resistors 114, 116, and 118 of differing resistances for measurement respectively of from 0–1000, 0–500, and 0–100 p.p.m. $O_2$ in the embodiment illustrated corresponding to the X10, X5, and X1 positions of switch 18 shown in FIG. 1. In another preferred embodiment the resistances of resistors 114, 116 and 118 are of three orders of magnitude for measurement respectively of from 0–1000, 0–100, and 0–10 p.p.m. $O_2$, switch 18 positions being indicated as X10, X1 and X.1.

In the operation of the system, meter 20 indicates a response proportional to cell 30 current output. Meter 20 having 100 divisions, when the system is in operation, the dial reading is multiplied by the factor indicated for the switch 18 position to determine amounts of $O_2$ in the gas being tested.

Operation of the system may continue until the cadmium is substantially oxidized. When the cadmium anode has been substantially consumed, i.e., converted to cadmium oxide, the cell may be recharged by applying a reverse current to the cell which converts the cadmium oxide to cadmium and which evolves $O_2$ at the carbon electrode. To remove the evolved $O_2$ an essentially oxygen free gas, e.g., the process gas used as the test gas sample, is continuously flowed across the face of the carbon electrode.

Though this invention has been described with reference to a preferred embodiment for trace $O_2$ analysis, it will be appreciated by those skilled in the art that variations thereof may be made which are within the scope of the following claims.

What is claimed is:

1. A trace gas analyzer comprising a detection cell which generates microamp currents in response to amounts up to 1000 p.p.m. of trace gas in a gaseous stream and means responsive to said microamp currents for measuring and indicating said amounts of trace gas, said detection cell comprising:

an air-tight housing enclosing a volume and having a gas inlet for said gaseous stream to be analyzed, a gas outlet for said gas after analysis and a liquid inlet;

a first electrically conductive, non-consumable, gas diffusion electrode of microporous, hydrophobic material spanning the interior of said housing dividing said volume into two chambers, a gas chamber adjacent said gas inlet and gas outlet on one side of said first electrode and an electrolyte chamber adjacent said liquid inlet on the other side of said first electrode including a reservoir for free liquid;

a second electrically conductive electrode in said electrolyte chamber partially occupying said electrolyte chamber;

a liquid electrolyte in said electrolyte chamber contacting said first and second electrodes and confined in said electrolyte chamber by said first porous electrode, a quantity of unadsorbed electrolyte at least partially occupying said reservoir;

electrical terminals and conductors connected to said electrodes and connecting said cell to said means for measuring and indicating amounts of said trace gas; and said first and second electrodes being planar, and being mounted parallel and in opposition to each other, said second electrode being vertically positioned in and spanning the interior of said housing between said first electrode and said reservoir, said second electrode having sufficient porosity to permit passage of said electrolyte therethrough from said reservoir to the space between said electrodes.

2. The analyzer claimed in claim 1 in which said first and second electrodes are substantially coextensive and closely spaced together, in which a porous planar separator of adsorbent sheet material substantially coextensive with said first and second electrodes is provided sandwiched between said first and second electrodes with the adjacent surfaces of said electrodes in contact with the surfaces of said separator thereadjacent, said second electrode and said separator only partially occupying said electrolyte chamber.

3. The analyzer claimed in claim 2 in which a plurality of discontinuous support posts extend from said housing adjacent and through said reservoir to and contacting said second electrode thereby supporting said second electrode within said housing.

4. The analyzer claimed in claim 3 in which said gas chamber comprises a labyrinthine groove on the interior of said housing adjacent said first electrode, the interior surface of said housing adjacent said groove contacting and supporting said first electrode within said housing.

5. The analyzer claimed in claim 4 in which said housing comprises two mating blocks, one block containing said reservoir, having said posts integral therewith, and having said second electrode, said separator and said first electrode, respectively, supported on separate steps therein, said second electrode supported at its margin on a first step, said separator extending beyond the margin of said second electrode about the periphery thereof and supported at its margin on a second step, and said first electrode extending beyond the margin of said separator about the periphery thereof and supported at its margin on a third step, the other of said blocks contacting said first electrode about the periphery thereof sealing said first electrode against said third step and having a portion outwardly of said first electrode facing a portion of said one block and a peripheral seal provided between said facing portions of said block rendering air-tight the volume enclosed by said blocks.

6. The analyzer claimed in claim 5 in which said one block is transparent.

7. The analyzer claimed in claim 6 in which said blocks comprise transparent polymeric material.

8. The analyzer claimed in claim 2 in which said separator comprises asbestos.

9. The analyzer claimed in claim 8 in which said blocks each have a metal frame about the periphery thereof and fastening means are provided connecting said frames to each other and securing said blocks together, said frames having apertures centrally thereof for viewing said blocks.

10. The analyzer claimed in claim 1 in which said first electrode comprises microporous, hydrophobic carbon.

11. The analyzer claimed in claim 1 in which said first electrode comprises microporous hydrophobic carbon in a matrix of hydrophobic polymeric material.

12. The analyzer claimed in claim 1 in which said second electrode comprises cadmium.

13. The analyzer claimed in claim 12 in which said electrolyte comprises potassium hydroxide.

References Cited

UNITED STATES PATENTS

| | | | |
|---|---|---|---|
| 2,861,926 | 11/1958 | Jacobson | 204—195 R |
| 3,149,921 | 9/1964 | Warner | 204—1 T |
| 3,455,807 | 7/1969 | Jacobson et al. | 204—195 R |
| 2,830,945 | 4/1958 | Keidel | 204—195 W |
| 3,385,736 | 5/1968 | Deibert | 136—86 D |
| 3,208,926 | 9/1965 | Eckfeldt | 204—195 R |

TA-HSUNG TUNG, Primary Examiner

U.S. Cl. X.R.

204—294